United States Patent
Qi et al.

(10) Patent No.: US 12,463,550 B2
(45) Date of Patent: Nov. 4, 2025

(54) LUMPED POWER SUPPLY CIRCUIT FOR CONVERTING AN AC SIGNAL INTO A DC SIGNAL

(71) Applicant: Silergy Semiconductor Technology (Hangzhou) LTD, Hangzhou (CN)

(72) Inventors: Yu Qi, Hangzhou (CN); Gao Fan, Hangzhou (CN); Wei Chen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 272 days.

(21) Appl. No.: 18/118,818

(22) Filed: Mar. 8, 2023

(65) Prior Publication Data

US 2023/0308029 A1   Sep. 28, 2023

(30) Foreign Application Priority Data

Mar. 28, 2022   (CN) .......................... 202210348066.4

(51) Int. Cl.
*H02M 7/23*      (2006.01)
*H02M 1/00*      (2006.01)
(Continued)

(52) U.S. Cl.
CPC ........... *H02M 7/219* (2013.01); *H02M 1/007* (2021.05); *H02M 1/14* (2013.01); *H02M 7/23* (2013.01)

(58) Field of Classification Search
CPC .......................... H02M 1/0074; H02M 1/0077
See application file for complete search history.

(56) References Cited

U.S. PATENT DOCUMENTS 8,581,518 B2    11/2013  Kuang et al.
11,292,352 B1 *  4/2022  Keister ................. H02M 7/487
(Continued)

FOREIGN PATENT DOCUMENTS

CN    102025145 A    4/2011
CN    106026685 A   10/2016
(Continued)

OTHER PUBLICATIONS

P. Hao, W. Zanji and C. Jianye, "Study on the Control of Shunt Active DC Filter for HVDC Systems," in IEEE Transactions on Power Delivery, vol. 23, No. 1, pp. 396-401, Jan. 2008 (Year: 2008).*

*Primary Examiner* — Peter M Novak

(57) ABSTRACT

A lumped power supply circuit for converting an AC signal into a DC signal, the lumped power supply circuit including: a cascaded H-bridge circuit having N H-bridge sub-circuits connected in series between two input terminals of the AC signal, and being configured to convert the AC signal into N first voltage signals, where N is a positive integer greater than or equal to 2; a high-frequency filtering module configured to filter the N first voltage signals, and to generate N second voltage signals; a DC conversion module to receive the N second voltage signals, and to convert the N second voltage signals into at least one third voltage signal; and a lumped power buffer module having an output terminal coupled to a load, and being configured to receive the at least one third voltage signal, and to filter out part of power frequency fluctuations in the third voltage signal.

10 Claims, 10 Drawing Sheets

(51) Int. Cl.
*H02M 1/14* (2006.01)
*H02M 7/219* (2006.01)

(56) References Cited

U.S. PATENT DOCUMENTS

| | | |
|---|---|---|
| 2011/0127925 A1 | 6/2011 | Huang et al. |
| 2017/0318639 A1 | 11/2017 | Wang et al. |
| 2018/0295685 A1 | 10/2018 | Wang et al. |
| 2018/0295690 A1 | 10/2018 | Chen et al. |
| 2018/0310376 A1 | 10/2018 | Huang et al. |
| 2021/0359606 A1 | 11/2021 | Han et al. |
| 2022/0029540 A1 | 1/2022 | Zhang et al. |

FOREIGN PATENT DOCUMENTS

| | | |
|---|---|---|
| CN | 110336320 A | 10/2019 |
| CN | 110535173 A | 12/2019 |

\* cited by examiner

LUMPED POWER SUPPLY CIRCUIT FOR CONVERTING AN AC SIGNAL INTO A DC SIGNAL

RELATED APPLICATIONS

This application claims the benefit of Chinese Patent Application No. 202210348066.4, filed on Mar. 28, 2022, and published on Sep. 28, 2023, which is incorporated herein by reference in its entirety.

FIELD OF THE INVENTION

The present invention generally relates to the field of power electronics, and more particularly to lumped power supply circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A traditional AC-DC system architecture based on a Cascaded H-Bridge (CHB) circuit topology is shown in the following figure. The front stage is a cascaded H-bridge power factor correction (CHB PFC) circuit with N (e.g., N=1) modules coupled in series, and the output can connect to the DC bus capacitor. Since the output DC bus of CHB may not be directly connected, it may need to be isolated by a DC/DC converter to connect to the load. Therefore, this traditional system architecture is isolated by a DC/DC converter, and then connected to the load.

Figure 1:
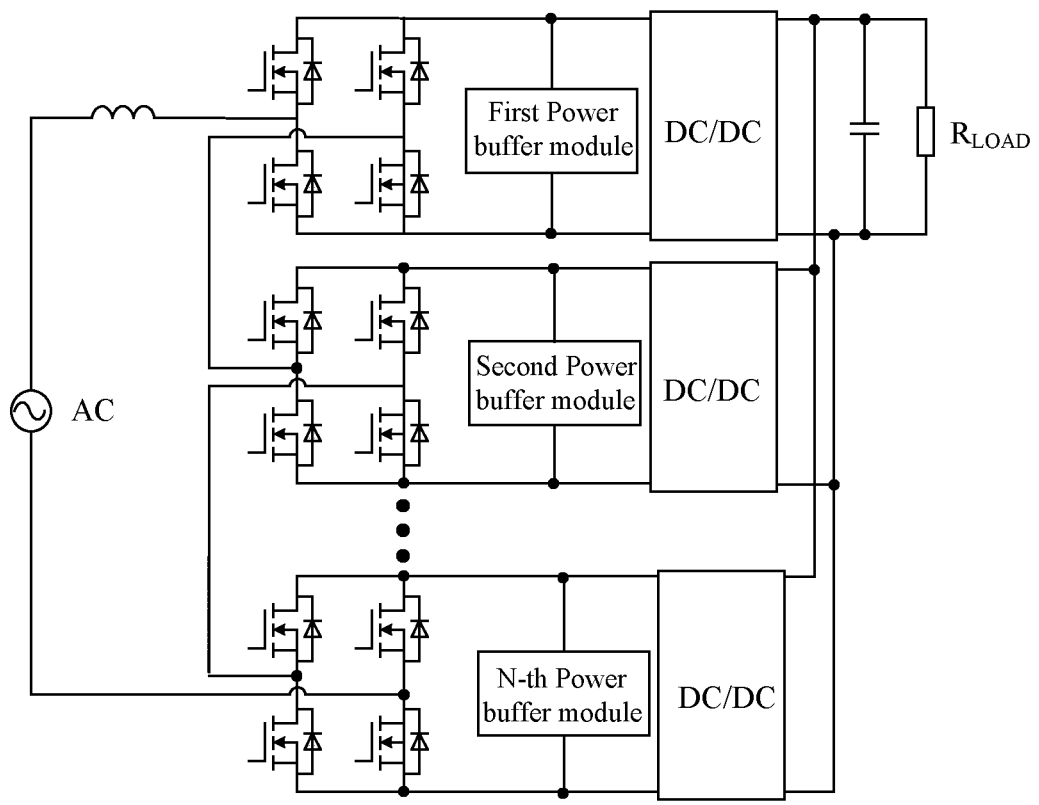
FIG. 1 is a schematic block diagram of a first example AC-DC system based on cascaded H-bridge circuit topology.

Referring now to FIG. 1, shown is a schematic block diagram of a first example AC-DC system based on cascaded H-bridge circuit topology. In this particular example, in order to achieve unity power factor, the input current may follow the input voltage with sinusoidal pulsation, so the AC input power has twice the power frequency pulsation. Therefore, it may be necessary to place power buffer modules on the DC bus of the output of each H-bridge of CHB to absorb twice the power frequency ripple. Otherwise, on the one hand, it can lead to very large voltage ripple on the input side of the DC/DC converter, which may not be conducive to the design of the post-stage DC/DC converter. On the other hand, it may lead to abnormal operation of CHB circuit. The common power buffer module can be the electrolytic capacitor C1', C2', ... CN', which has a relatively large capacitance as shown in FIG. 2, or the Active Power Decoupling Circuit (APDC) shown in FIG. 3.

Figure 2:
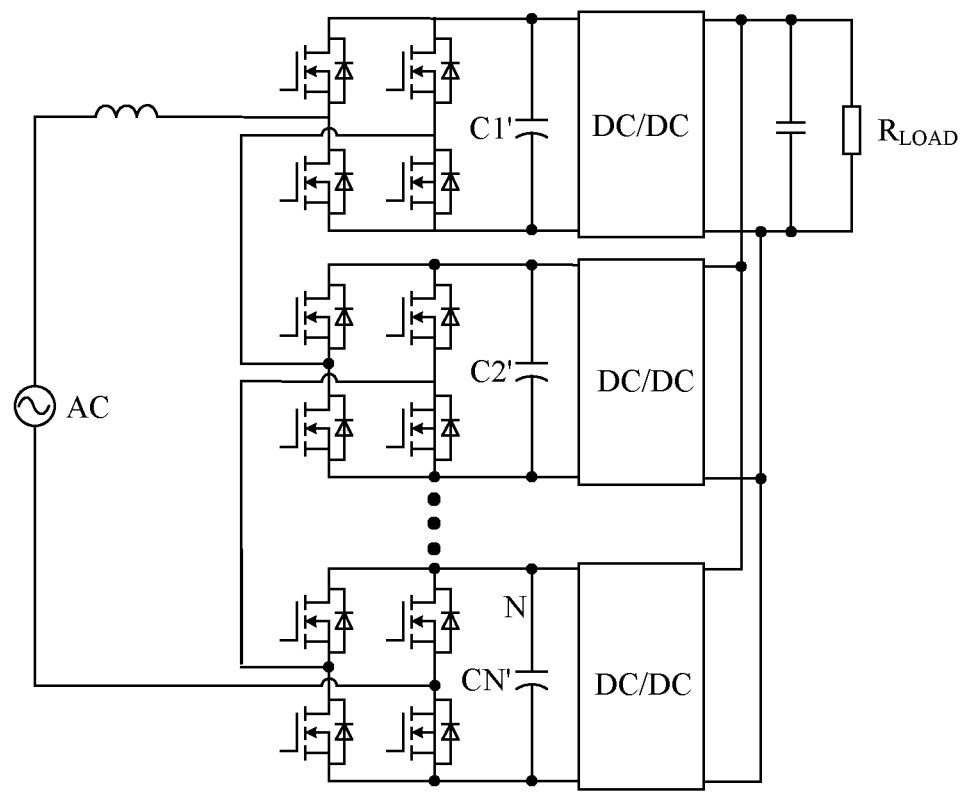
FIG. 2 is a schematic block diagram of a second example AC-DC system based on cascaded H-bridge circuit topology.

Referring now to FIG. 2, shown is a schematic block diagram of a second example AC-DC system based on cascaded H-bridge circuit topology. In this particular example, when N electrolytic capacitors C1', C2', . . . CN' are arranged, the power pulsation can be absorbed. Because the electrolytic capacitor can absorb the power frequency ripple, the volume may often be relatively large, which is an important bottleneck restricting the increase of system power density. Therefore, it may be necessary to take measures to reduce the volume of electrolytic capacitors. In the CHB system, each unit may require a large electrolytic capacitor, and a total of N large electrolytic capacitors may be required, resulting in a relatively large system volume. In addition, the large electrolytic capacitance of multiple units can also cause problems such as low system reliability.

Figure 3:
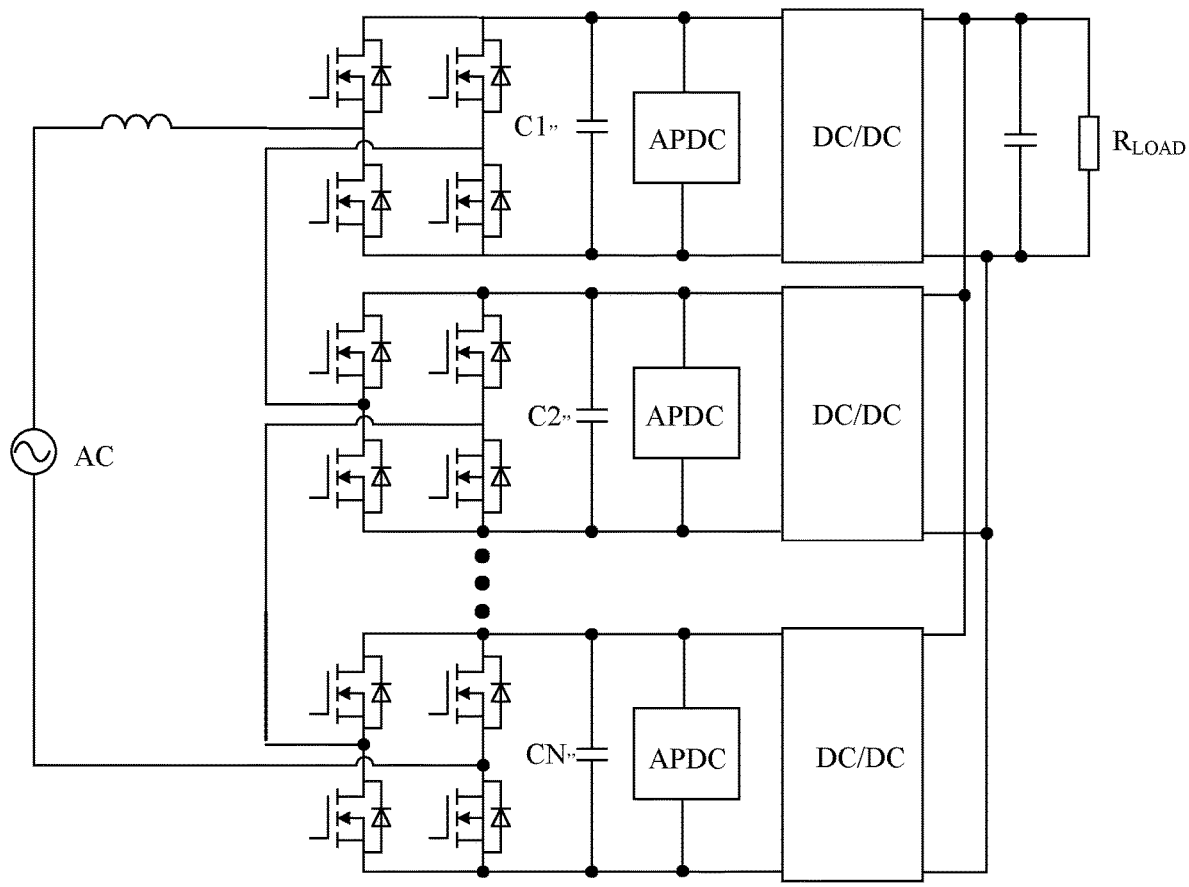
FIG. 3 is a schematic block diagram of a third example AC-DC system based on cascaded H-bridge circuit topology.

Referring now to FIG. 3, shown is a schematic block diagram of a third example AC-DC system based on cascaded H-bridge circuit topology. In this particular example, N power decoupling circuits are placed, although the electrolytic capacitor C1", C2", . . . . CN" can be reduced by using the active power decoupling circuit shown in FIG. 3. However, this distributed bus architecture may require N sets of power decoupling circuits (which can include power semiconductors, inductors, and controllers), and can also sacrifice the volume of the system. In addition, each unit may need to be designed as a DC/DC converter with voltage regulation function, which may not be conducive to the improvement of system power density. As used herein, a "power decoupling circuit" can include two power switches connected in series, and an output inductor connected to a node of the two power switches.

Figure 4:
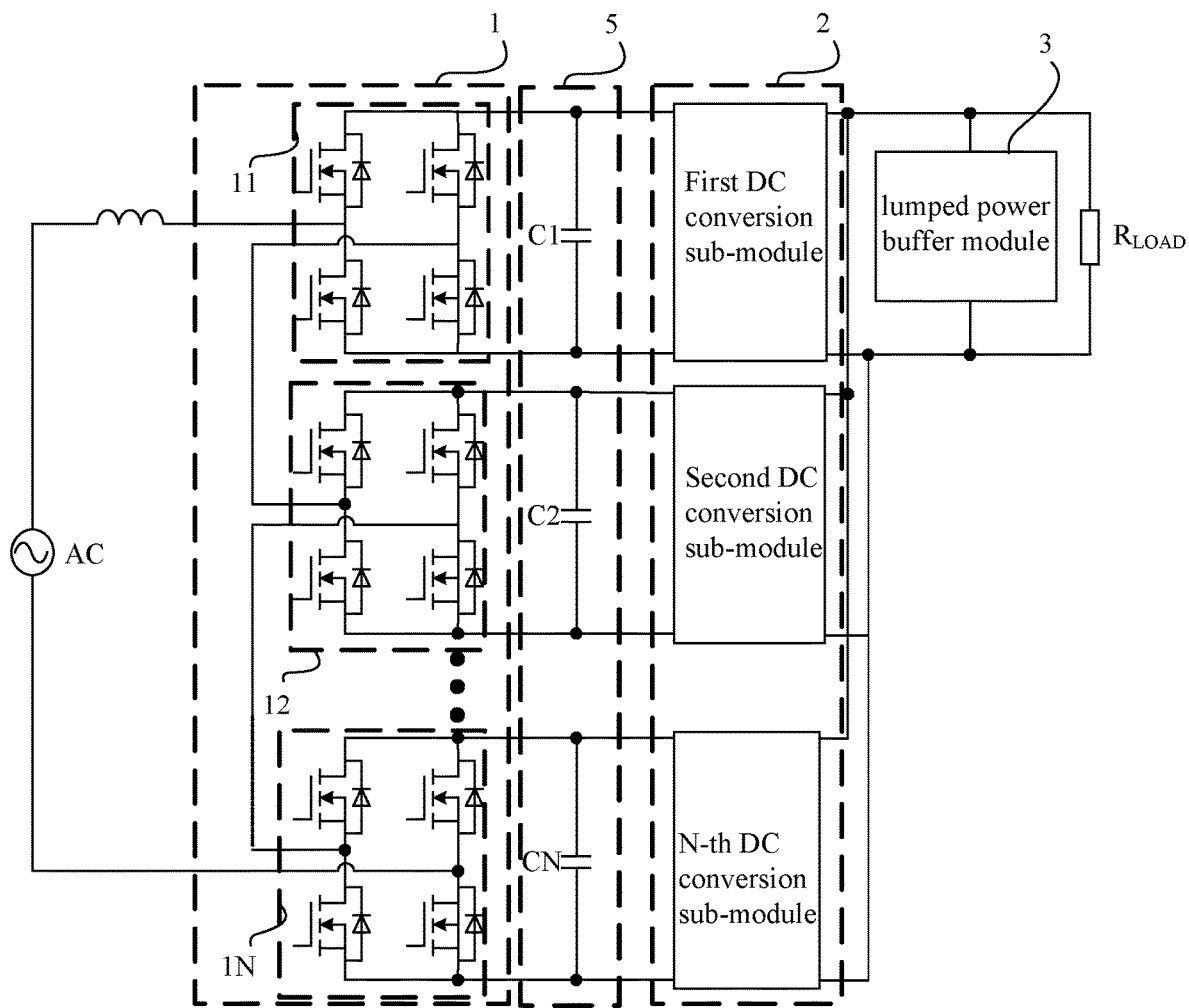
FIG. 4 is a schematic block diagram of a first example lumped power supply circuit, in accordance with embodiments of the present invention.

Referring now to FIG. 4, shown is a schematic block diagram of a first example lumped power supply circuit, in accordance with embodiments of the present invention. This example lumped power supply circuit can convert an alternating current (AC) signal into a direct current (DC) signal. The lumped power supply circuit can include cascaded H-bridge circuit 1, DC conversion module 2, high frequency filter module 5, and lumped power buffer module 3. Cascaded H-bridge circuit 1 can include N cascaded H-bridge sub-circuits 11, 12 to 1N, which can convert the AC signal into N first voltage signals, where N is a positive integer, N≥2. The N first voltage signals output by the N H-bridge sub-circuits can be filtered by high-frequency filter module 5, in order to generate N second voltage signals. DC conversion module 2 may receive the N second voltage signals and converts the N second voltage signals into K third voltage signals, where K is a positive integer, K≥1.

Lumped power buffer module 3 can absorb twice the power frequency pulsation in its input signal. An output terminal of lumped power buffer module 3 can connect to load $R_{LOAD}$. Lumped power buffer module 3 can replace the N distributed power buffer modules connected to the output terminal of cascaded H-bridge circuit 1 in the background. As shown in FIG. 4, high-frequency filter module 5 can include N high-frequency filter circuits to filter out the high-frequency ripple of the switches in cascaded H-bridge circuit 1. Each high-frequency filter circuit can be coupled between two output terminals of a corresponding one of the H-bridge sub-circuits, in order to generate the N second voltage signals. N high frequency filter circuits may correspond to filter capacitors C1, C2, . . . CN that have smaller capacitance.

In particular embodiments, DC conversion module 2 can include N DC conversion sub-modules, namely: the first DC conversion sub-module, the second DC conversion sub-module . . . the N-th DC conversion sub-module. An input terminal of each DC conversion sub-module is connected to the output terminal of a corresponding one of the H-bridge sub-circuits, and each DC conversion sub-module receives a corresponding one of the second voltages, and may generate the third voltage signal. In this example, K=N, DC conversion module 2 can output N third voltage signals. The output terminals of DC conversion sub-modules can connect in parallel with the input terminal of lumped power buffer module 3.

In particular embodiments, the DC conversion sub-module can be a DC-DC power stage circuit operating in a non-voltage regulation mode, such as a DC transformer, or a DC-DC power stage circuit operating in a voltage regulation mode, such as a DC/DC converter. When the DC conversion sub-module is a DC transformer operating in the non-voltage regulation mode, each DC conversion sub-module can be a DC-DC power stage circuit operating in a fixed gain mode. In this case, each DC conversion sub-module can be equivalent to a DC transformer (DCX), so the DC bus of the CHB can be 'clamped' by DCX. Under the condition of ensuring the voltage sharing of the output capacitor in the CHB, this can also ensure normal operation of cascaded H-bridge circuit 1.

Figure 5:
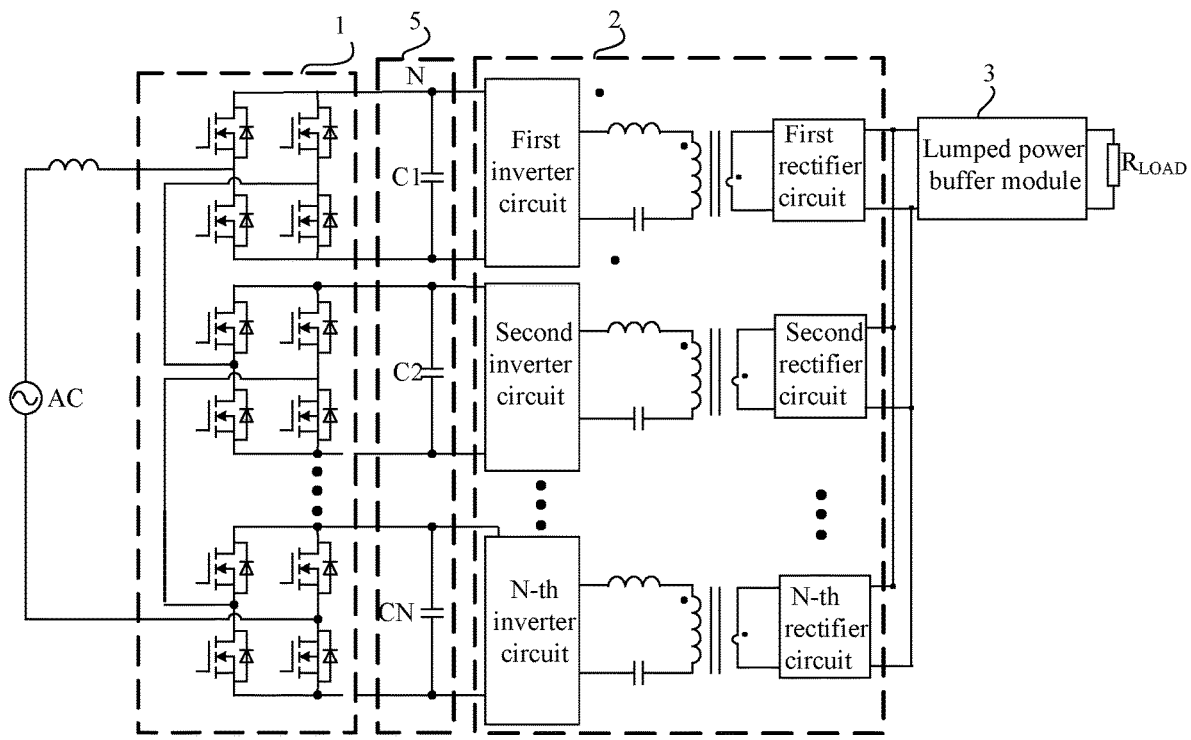
FIG. 5 is a schematic block diagram of a second example lumped power supply circuit, in accordance with embodiments of the present invention.

Referring now to FIG. 5, shown is a schematic block diagram of a second example lumped power supply circuit, in accordance with embodiments of the present invention. When each DC conversion sub-module is a DC-DC power stage circuit operating in a fixed gain mode, the DC conversion sub-module can include an inverter circuit, a primary winding, a secondary winding, and a rectifier circuit. In this case, because lumped power buffer module 3 has limited ability to absorb power frequency pulsation, some power frequency pulsation on the DC bus may still exist.

Figure 6:
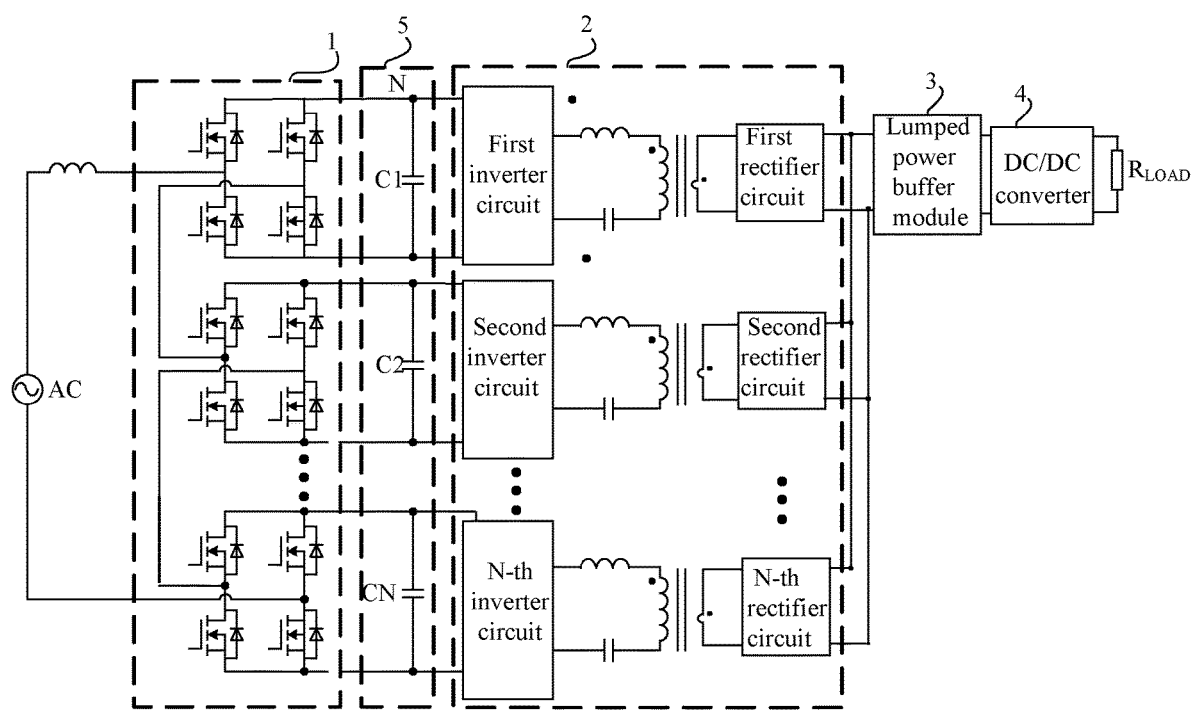
FIG. 6 is a schematic block diagram of a third example lumped power supply circuit, in accordance with embodiments of the present invention.

Referring now to FIG. 6, shown is a schematic block diagram of a third example lumped power supply circuit, in accordance with embodiments of the present invention. This example lumped power supply circuit can also include a second DC-DC power stage circuit operating in the voltage regulation mode, which can connect between the two output terminals of lumped power buffer module 3 to achieve further absorption of power frequency pulsation. In this example, the second DC-DC power stage circuit is DC/DC converter 4. Further, lumped power buffer module 3 can be a relatively large electrolytic filter capacitor or a power decoupling circuit, or some other suitable structures of the combination of an electrolytic filter capacitor and a power decoupling circuit that meet circuit requirements. When the lumped power buffer module is a combination of the capacitor and the power decoupling circuit, the capacitor and the decoupling circuit can be coupled in series or in parallel.

Figure 7:
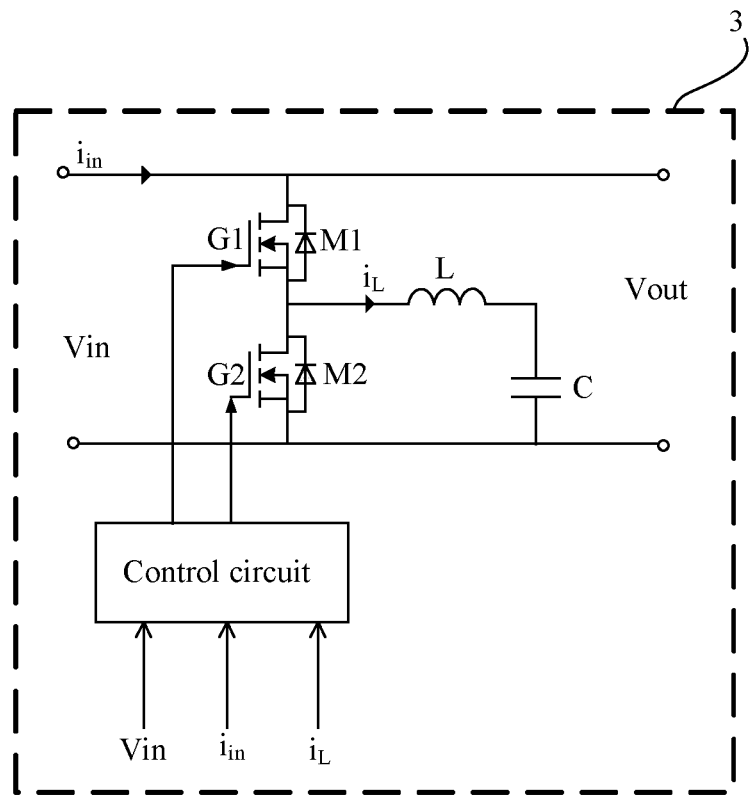
FIG. 7 a schematic block diagram of an example power decoupling circuit, in accordance with embodiments of the present invention.

Referring now to FIG. 7, shown is a schematic block diagram of an example power decoupling circuit, in accordance with embodiments of the present invention. This example power decoupling circuit can include a control circuit, two power switches M1, M2, output inductor L, and capacitor C. The control circuit can adjust driving signals G1 and G2 of power switches M1 and M2 according to input voltage Vin, current $i_{in}$, and current $i_L$ flowing through output inductor L, in order to adjust the switching state of power switches M1 and M2, such that lumped power buffer module 3 generates an AC signal to compensate for the fluctuation of input current $i_{in}$, thereby reducing the fluctuation of input voltage Vin (bus voltage).

In order to achieve the effect of filtering out power frequency fluctuations achieved by N distributed power decoupling circuits in the background, when lumped power buffer module 3 is a relatively large electrolytic capacitor, capacitance value C of the electrolytic capacitor can correspond to the sum of the capacitance values C1', C2', . . . CN' of the N distributed electrolytic capacitors in the example of FIG. 2. That is, C=C1'+C2'+ . . . +CN'. When lumped power buffer module 3 is a power decoupling circuit, the structure of the power decoupling circuit can be the same as the N distributed power decoupling circuits in the example of FIG. 3, but the values of the capacitance and inductance may be different from those in the distributed power decoupling circuit.

In this particular example, N distributed power buffer modules connected to the output terminal of each H-bridge sub-circuit in cascaded H-bridge circuit 1 can be lumped and placed at the output terminal of the subsequent DC conversion module 2, which may be equivalent to 'lumping' the dispersed N large electrolytic capacitors or N power buffer modules to be one large electrolytic capacitor or one power buffer module that is coupled to the output terminal, such that the output terminal of each H-bridge sub-circuit in cascaded H-bridge circuit 1 no longer needs to place N large electrolytic capacitors. In this way, as shown in FIGS. 4-7, only smaller capacitors C1, C2 . . . CN may be placed at the output terminal of each H-bridge sub-circuit to filter out the high-frequency ripple in each H-bridge sub-circuit, which can improve the reliability of the system and the power density.

Figure 8:
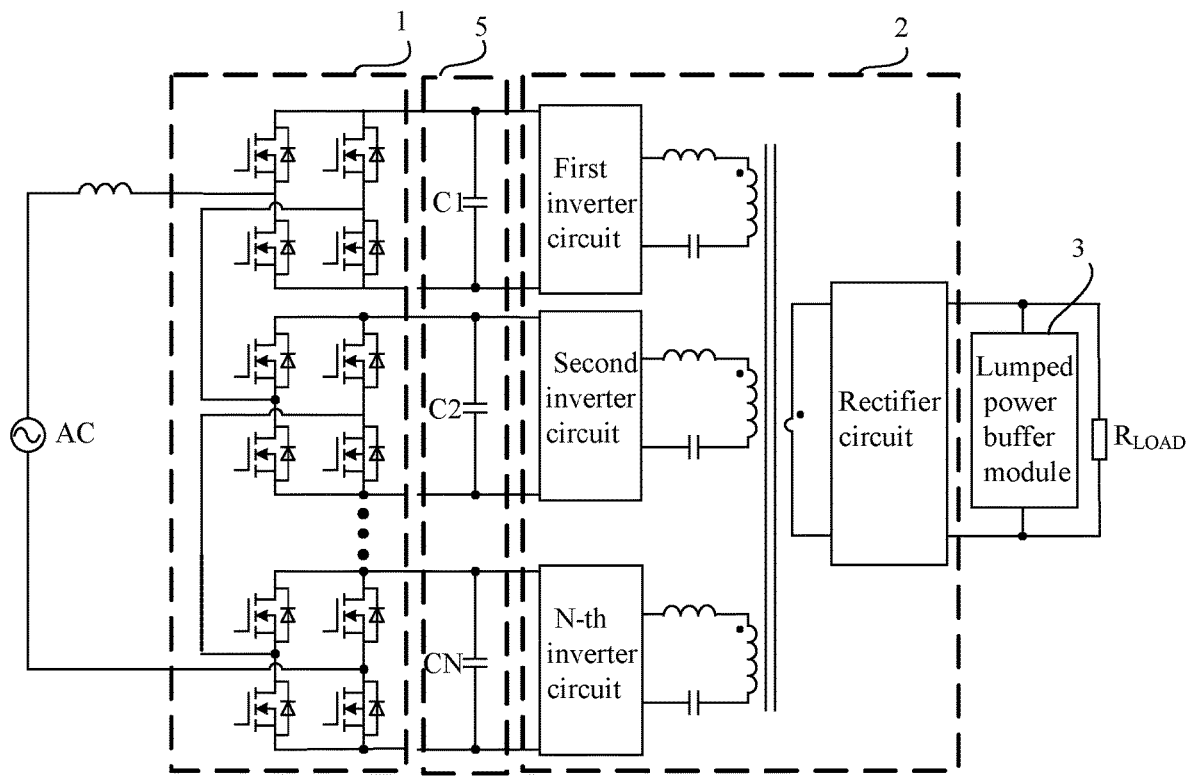
FIG. 8 a schematic block diagram of a fourth example lumped power supply circuit, in accordance with embodiments of the present invention.
Figure 9:
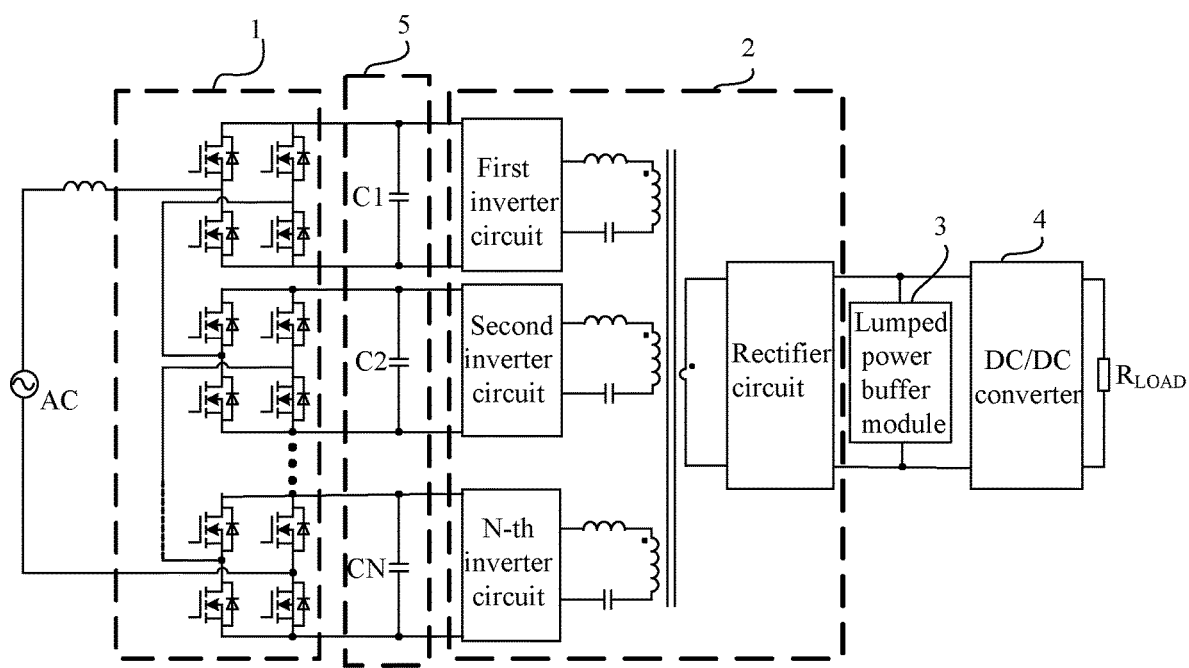
FIG. 9 is a schematic block diagram of a fifth example lumped power supply circuit, in accordance with embodiments of the present invention.
Figure 10:
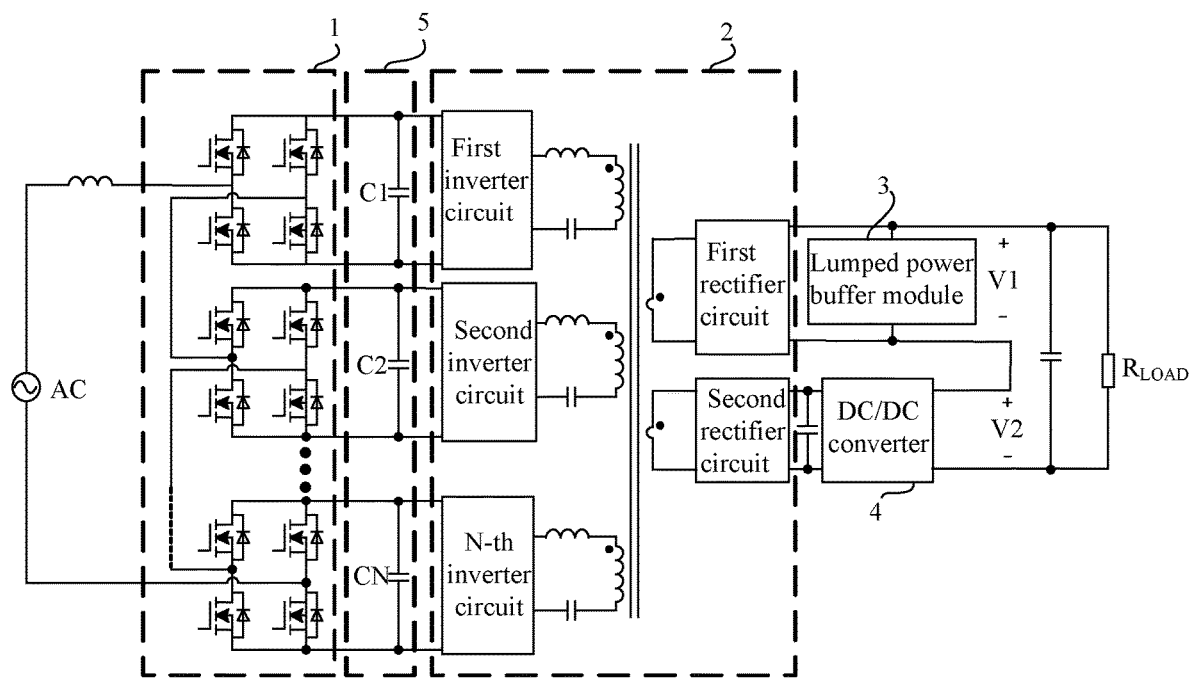
FIG. 10 is a schematic block diagram of a sixth example lumped power supply circuit, in accordance with embodiments of the present invention.

In particular embodiments, another lumped power supply circuit is provided, as shown in FIGS. 8-10. Except for DC conversion module 2, the structure of the lumped power supply circuit in these examples is substantially the same as that in the examples above. In this particular example, DC conversion module 2 is different from N DC conversion sub-modules in the examples above, and DC conversion module 2 is a DC transformer. The DC transformer can include N inverter circuits, N primary side windings, K secondary side windings, and rectifier circuits with the same number of secondary side windings. The N primary side windings can be respectively connected between the two output terminals of a corresponding one of the high frequency filter circuits through N inverter circuits. The K secondary side windings can be connected to the K rectifier circuits one-to-one, and the K rectifier circuits output K third voltage signals, where K is a positive integer, and part or all of the output terminals of the rectifier circuits can connect to the input terminal of lumped power buffer module 3.

Referring now to FIG. 8, shown is a schematic block diagram of a fourth example lumped power supply circuit, in accordance with embodiments of the present invention. In this particular example, K=1, and K can also be any other positive integer. When K≥2, the K output terminals of the DC transformer can connect in parallel with each other and connected to lumped power buffer module 3. Here, the output terminal of the rectifier circuits can connect to the input terminal of lumped power buffer module 3.

Referring now to FIG. 9, shown is a schematic block diagram of a fifth example lumped power supply circuit, in accordance with embodiments of the present invention. In this particular example, the output terminal of lumped power buffer module 3 can also connect to a second DC-DC power stage circuit operating in the voltage regulation mode. In this example, the second DC-DC power stage circuit is DC/DC converter 4, in order to realize the voltage regulation function and make the output voltage to load $R_{LOAD}$ stable.

Referring now to FIG. 10, shown is a schematic block diagram of a sixth example lumped power supply circuit, in accordance with embodiments of the present invention. In this particular example, K=2, one of the output terminals of the DC transformer can connect with the input terminal of lumped power buffer module 3, and the output voltage of lumped power buffer module 3 is V1. Another output terminal of the DC transformer can connect with the input terminal of DC/DC converter 4, and the output voltage of DC/DC converter 4 is V2. The output terminal of lumped power buffer module 3 can connect in series with the output terminal of DC/DC converter 4, and the sum of output voltages V1 and V2 may be provided to load $R_{LOAD}$. Therefore, the sum of output voltages V1 and V2 output to load $R_{LOAD}$ load can absorb the power frequency pulsation of voltage V1 on the one hand through lumped power buffer module 3, and on the other hand, may realize the regulation function of voltage V2 through DC/DC converter 4, in order to further absorb the power frequency pulsation.

In particular embodiments, when K≥3, the i output terminals of the K output terminals of the DC transformer can connect with the input terminal of DC/DC converter 4. When 2≤i≤K, the i output terminals of the K output terminals of the DC transformer can connect in parallel with each other and can connect with the input terminal of the DC/DC converter 4, and the remaining K−i output terminals of the DC transformer can connect to lumped power buffer module 3. When K−i≥2, the remaining K−i output terminals of the DC transformer can connect in parallel with each other and connected to lumped power buffer module 3. For example, the output voltage of lumped power buffer module 3 is V1, and the output voltage of DC/DC converter 4 is V2. When the output terminals of lumped power buffer module 3 and DC/DC converter 4 are connected in series, the sum of voltages V1 and V2 may be provided to load $R_{LOAD}$.

In this way, particular embodiments provide a lumped power supply circuit for converting an AC signal into a DC signal, including a cascaded H-bridge circuit, a high-frequency filter module, a DC conversion module, and a lumped power buffer module. The cascaded H-bridge circuit can include N H-bridge sub-circuits that are connected in series with each other at the input terminal of the AC signal and can convert the AC signal into N first voltage signals, where N is a positive integer, N≥2. The output signal of each H-bridge sub-circuit may be filtered by a high-frequency filter module, in order to generate N second voltage signals. The DC conversion module can receive the N second voltage signals and convert the N second voltage signals into at least one third voltage signal.

The lumped power buffer module may receive the at least one third voltage signal, and can filter out some of the power frequency fluctuations in the third voltage signal. The output terminal of the lumped power buffer module can be coupled to the load, rather than the N distributed power buffer modules connected to the output terminal of cascaded H-bridge circuit 1. The lumped power supply circuit of particular embodiments may adopt a lumped power buffer module to replace N distributed power buffer modules connected to the output terminal of cascaded H-bridge circuit 1, which can improve the reliability of the system and the power density. In particular embodiments, the power switch may any suitable electrically controllable switching devices, such as a metal-oxide-semiconductor field-effect transistor (MOSFET), a bipolar-junction transistor (BJT), or an insulated-gate bipolar transistor (IGBT).

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A lumped power supply circuit for converting an alternating current (AC) signal into a direct current (DC) signal, the lumped power supply circuit comprising:
   a) a cascaded H-bridge circuit having N H-bridge sub-circuits connected in series between two input terminals of the AC signal, and being configured to convert the AC signal into N first voltage signals, wherein N is a positive integer greater than or equal to 2;
   b) a high-frequency filtering module configured to filter the N first voltage signals, and to generate N second voltage signals;
   c) a DC conversion module configured to receive the N second voltage signals, and to convert the N second voltage signals into K third voltage signals, wherein K is a positive integer;
   d) a lumped power buffer module comprising an output terminal coupled to a load, and being configured to receive the K third voltage signals, and to filter out part of power frequency fluctuations in the K third voltage signals;

e) wherein the DC conversion module comprises N DC conversion sub-modules, an input terminal of each DC conversion sub-module receives a corresponding one of the second voltage signals, and output terminals of DC conversion sub-modules are connected in parallel and coupled with an input terminal of the lumped power buffer module;

f) when the DC conversion sub-module is a DC-DC power stage circuit operating in a fixed gain mode and K=1, the lumped power supply circuit comprises a second DC-DC power stage circuit operating in a voltage regulation mode; and g) the second DC-DC power stage circuit comprises an input terminal connected to an output terminal of the lumped power buffer module, and an output terminal connected to the load.

2. The lumped power supply circuit of claim 1, wherein the high-frequency filtering module comprises N high-frequency filter circuits, and each high-frequency filter circuit is coupled between two output terminals of a corresponding one of the H-bridge sub-circuits.

3. The lumped power supply circuit of claim 1, wherein the DC conversion sub-module is a DC-DC power stage circuit operating in a fixed gain mode or a DC-DC power stage circuit operating in a voltage regulation mode.

4. The lumped power supply circuit of claim 1, wherein the DC conversion module comprises:
 a) N inverter circuits, wherein an input terminal of each inverter circuit receives a corresponding one of the second voltage signals;
 b) a transformer comprising N primary windings and at least one secondary winding;
 c) at least one rectifier circuit; and
 d) wherein a number of the rectifier circuit equals a number of the secondary winding, each primary winding is connected to an output terminal of a corresponding one of the inverter circuits, and each secondary winding is connected to an input terminal of a corresponding one of the at least one rectifier circuit.

5. The lumped power supply circuit of claim 4, wherein the at least one output terminal of the at least one rectifier circuit is coupled to the lumped power buffer module.

6. The lumped power supply circuit of claim 4, wherein:
 a) when all the output terminals of the at least one rectifier circuit are connected with an input terminal of the lumped power buffer module, the lumped power supply circuit comprises a second DC-DC power stage circuit operating in a voltage regulation mode; and
 b) the second DC-DC power stage circuit comprises an input terminal connected to the output terminal of the lumped power buffer module, and an output terminal connected to the load.

7. The lumped power supply circuit of claim 1, wherein the lumped power buffer module comprises a filter capacitor.

8. The lumped power supply circuit of claim 1, wherein the lumped power buffer module is configured as a power decoupling circuit that generates an AC signal according to an input signal of the power decoupling circuit to compensate fluctuations of the input signal, in order to reduce the fluctuations of the input signal.

9. The lumped power supply circuit of claim 1, wherein the lumped power buffer module comprises a filter capacitor and a power decoupling circuit, and the power decoupling circuit generates an AC signal according to an input signal of the power decoupling circuit to compensate fluctuations of the input signal, in order to reduce the fluctuations of the input signal.

10. A lumped power supply circuit for converting an alternating current (AC) signal into a direct current (DC) signal, the lumped power supply circuit comprising:
 a) a cascaded H-bridge circuit having N H-bridge sub-circuits connected in series between two input terminals of the AC signal, and being configured to convert the AC signal into N first voltage signals, wherein N is a positive integer greater than or equal to 2;
 b) a high-frequency filtering module configured to filter the N first voltage signals, and to generate N second voltage signals;
 c) a DC conversion module configured to receive the N second voltage signals, and to convert the N second voltage signals into K third voltage signals, wherein K is a positive integer;
 d) a lumped power buffer module comprising an output terminal coupled to a load, and being configured to receive the K third voltage signals, and to filter out part of power frequency fluctuations in the K third voltage signals;
 e) wherein the DC conversion module comprises N inverter circuits, wherein an input terminal of each inverter circuit receives a corresponding one of the second voltage signals, a transformer comprising N primary windings and at least one secondary winding, at least one rectifier circuit, and wherein a number of the rectifier circuit equals a number of the secondary winding, each primary winding is connected to an output terminal of a corresponding one of the inverter circuits, and each secondary winding is connected to an input terminal of a corresponding one of the at least one rectifier circuit;
 f) wherein when part of the output terminals of the at least one rectifier circuit are connected with an input terminal of the lumped power buffer module, the lumped power supply circuit further comprises a second DC-DC power stage circuit operating in a voltage regulation mode; and
 g) wherein the second DC-DC power stage circuit comprises an input terminal connected to a remaining part of the output terminals of the at least one rectifier circuit, and an output terminal of the lumped power buffer module and the output terminal of the second DC-DC power stage circuit are connected in series at both terminals of the load.

* * * * *